(12) United States Patent
Mazur et al.

(10) Patent No.: US 6,286,913 B1
(45) Date of Patent: Sep. 11, 2001

(54) LIMP-IN CONTROL ARRANGEMENT FOR AN ELECTRO-PNEUMATIC BRAKE CONTROL SYSTEM

(75) Inventors: Richard J. Mazur, Greer, SC (US); Richard F. Balukin, Pittsburgh; Robert D. Dimsa, Elizabeth, both of PA (US); Paul E. Jamieson, Greer, SC (US)

(73) Assignee: Westinghouse Air Brake Company, Wilmerding, PA (US)

( * ) Notice: Subject to any disclaimer, the term of this patent is extended or adjusted under 35 U.S.C. 154(b) by 674 days.

(21) Appl. No.: 08/556,198

(22) Filed: Nov. 9, 1995

(51) Int. Cl.⁷ ..................................................... B60T 13/70
(52) U.S. Cl. .................................................. 303/15; 303/7
(58) Field of Search ................................. 303/3, 7, 9, 15

(56) References Cited

U.S. PATENT DOCUMENTS

| | | | |
|---|---|---|---|
| 4,598,953 | * 7/1986 | Wood et al. | 303/15 X |
| 4,904,027 | * 2/1990 | Skantar et al. | 303/15 |
| 4,978,179 | * 12/1990 | Balukin | 303/86 X |
| 5,222,788 | * 6/1993 | Dimsa et al. | 303/15 |

* cited by examiner

Primary Examiner—Robert Oberleitner
Assistant Examiner—Pamela J. Rodriguez
(74) Attorney, Agent, or Firm—James Ray & Associate

(57) ABSTRACT

A limp-in control arrangement for an electro-pneumatic integrated control system for railway vehicles including a supply and exhaust magnet valve for electrically controlling the pneumatic brakes on the railway vehicle, an electromagnetic relay for sensing the operational condition of the electro-pneumatic integration control system, a switching device for enabling a limp-in control function when the electro-pneumatic integrated control system is experiencing a malfunction, an operating device for initiating a limp-in control function by releasing and reapplying the pneumatic brakes to allow the railway vehicle to be moved to a repair facility.

19 Claims, 1 Drawing Sheet

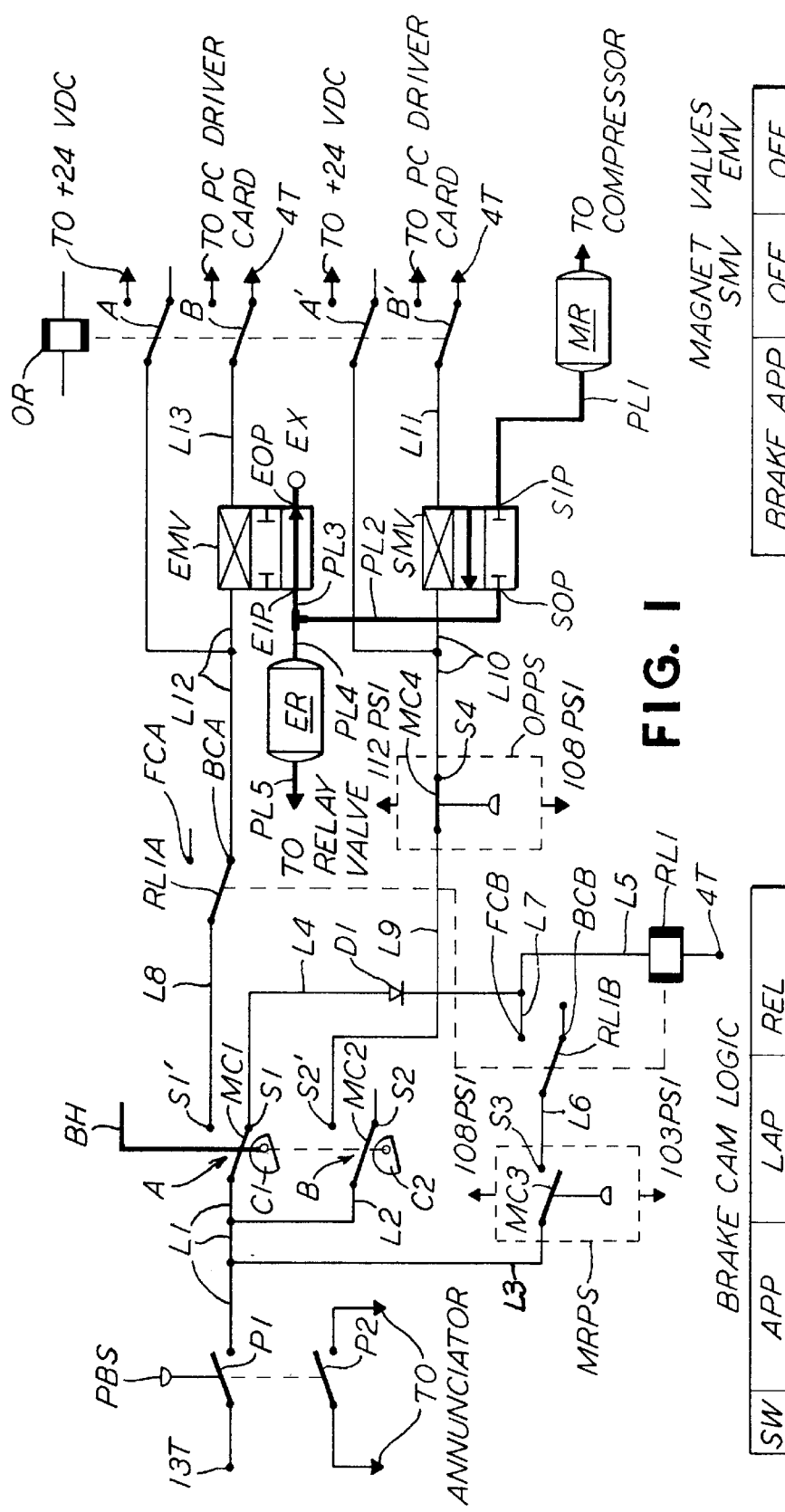

LIMP-IN CONTROL ARRANGEMENT FOR AN ELECTRO-PNEUMATIC BRAKE CONTROL SYSTEM

FIELD OF THE INVENTION

This invention relates to a limp-in feature for controlling the air brakes for railway vehicles and, more particularly, to a limp-in control arrangement for permitting the application and release of the brakes on a disabled railway vehicle when the electro-pneumatic integrated control system experiences an electrical malfunction so that the disabled railway vehicle can be moved to a repair shop.

BACKGROUND OF THE INVENTION

In certain electro-pneumatic brake control systems, the brake pipe control is dependent upon the functional operation of the electronics. If the electronics in existing electro-pneumatic integration control system malfunction, there is currently no electrical way in the controlling cab to operate the train brakes. The present electro-pneumatic integrated control system is provided with a pneumatic backup arrangement to generate brake cylinder pressure when the brake pipe is varied. It would be very beneficial to provide an alternate electrical means for controlling brake pipe pressure when the computer of the electro-pneumatic integrated control system malfunctions. Such an arrangement could be used as a limp-in control to permit the trainman or operator to manually switch to this mode and move the train to a repair shop or the like.

OBJECTS AND/OR SUMMARY OF THE INVENTION

Accordingly, it is an object of this invention to provide a unique limp-in control feature for an electro-pneumatic integrated control system for railway vehicles.

A further object of this invention is to provide a new arrangement of releasing the brakes on railway vehicles during an electronic failure.

Another object of this invention is to provide a novel electrical apparatus for controlling the brakes on a disabled railway vehicle.

Yet a further object of this invention is to provide a new and improved limp-in feature for allowing a railway vehicle to be moved by applying/releasing the brakes of a train.

Yet another object of this invention is to provide a unique arrangement for electrically controlling the pneumatic-operated brakes on a railway train which is equipped with an electro-pneumatic integrated control system.

Still a further object of this invention is to provide a novel and unique limp-in control arrangement for an electro-pneumatic integrated control system for railway vehicles comprising, an exhaust magnet valve and a supply magnet valve in which the electrical conditions control the brakes on the railway vehicle, means for sensing the operational condition of said electro-pneumatic integrated control system, means for enabling a limp-in control function when said electro-pneumatic integrated control system is experiencing a malfunction, means for initiating a limp-in operation by releasing and reapplying the brakes so that the railway vehicle may be moved to repair said malfunction.

Still another object of this invention is to provide a limp-in control arrangement which is economical in cost, unique in design, efficient in operation, dependable in service, durable in use, and simple in construction.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIG. 1 is a partial diagrammatic illustration of a manual limp-in control arrangement for an electro-pneumatic integrated circuit brake control system for railway vehicles in accordance with the present invention.

FIG. 2 is a truth table of the positions of a pair of cam-operated switches when the brake handle is moved to its application, lap and released positions.

FIG. 3 is a truth table of the electrical conditions of the supply and exhaust electromagnetic valves when the brake handle is moved to its application, release and lap positions.

DETAILED DESCRIPTION OF THE INVENTION

Referring now to the drawing and, in particular, to FIG. 1, there is shown the limp-in control portion of an electro-pneumatic integrated control system for railway locomotives, such as, passenger trains or mass and/or rapid transit cars. As shown, the braking system includes a CS-2 type of automatic brake handle BH, which does not include a continuous range of brake applications but includes six discrete positions, such as: release, holding, lap, service, handle-off, and emergency. This limp-in control arrangement can also be used with standard pneumatics, CS1 or CS2 arrangements with push-button switches.

The release, handle-off and emergency positions behave in the same manner as the present continuous range handle operation. The release position discharges brake cylinder and charges brake pipe, the handle-off position bleeds off brake pipe giving a complete reduction, and emergency position initiates an automatic brake emergency. The service position reduces brake pipe at a controlled rate, and will continue to reduce it as long as the handle is in service position. The service position also acts as suppression position. Moving the handle from service position to the lap position halts the reduction at the current brake pipe pressure. The operator moves the handle back and forth in these positions to reduce brake pipe to the desired position, instead of a fixed handle position determining the reduction, and automatically lapping. With brakes applied, the operator may move the auto handle to holding position, and in this position brake pipe is allowed to recharge, but brake cylinder is held constant (brakes remain on). The pressure in brake cylinder will not be exhausted until the brake handle is moved back to release position.

It will be seen that automatic brake handle operates a pair of movable cam members C1 and C2, which will be described in greater detail hereinafter.

In viewing FIG. 1, it will be noted that the output of a filtered main reservoir MR is pneumatically connected to the input port SIP of the supply magnet valve SMV via pipe line PL1. The air pressure in the main reservoir MR is maintained at a desired psi level by a suitable air compressor (not shown). As shown, the output port SOP of the supply magnet valve SMV is connected to pipe line PL2 which in turn is connected by pipe line PL3 to the input port EIP of the exhaust magnet valve EMV and by pipe line PL4 to the input of an equalizing reservoir ER. The output of the equalizing reservoir is connected by pipe line PL5 to a relay air valve (not shown) which in turn is connected to brake pipe. The exhaust magnet valve EMV includes an output port EOP which is exhausted to atmosphere EX.

In viewing FIG. 1, it will be appreciated that when the electro-pneumatic integrated control system is operating properly, the electromagnetic relay OR is energized so that the movable contacts A and A' engage their front contacts and connect one end of the coil of the exhaust magnet valve EMV to +24 VDC and one end of the coil of the supply magnet valve SMV to +24 VDC, respectively. During normal operation, the movable contacts B and B' of the energized electromagnetic relay OR connect the other end of the coil of the exhaust magnet valve EMV to the drive card of the microprocessor or computer and also the other end of the coil of the supply magnet valve SMV to the drive card of the microprocessor or computer, respectively.

It will be assumed that either the computer has malfunctioned, or the +24 VDC power supply has been interrupted so that the operational relay OR becomes deenergized. This causes the movable contacts A, A', B and B' to drop away and assume the positions as shown in FIG. 1. Thus, the movable contacts A and A' engage the open back contacts while the movable contacts B and B' close the back contacts to return trainline 4T. As shown in FIG. 1, the brakes are automatically applied during such electrical failures since the deenergized supply magnet valve SMV closes off the main reservoir and the deenergized exhaust magnet valve EMV exhausts the equalizing reservoir ER to atmosphere. In order to allow the train or relay car to limp-in to a repair shop or the like, some means must be provided to release the brakes. As shown, the limp-in control circuit normally opens double pole pushbutton electrical switch PBS. It will be seen that one terminal of the one pole P1 of the switch PBS connects power trainline 13T to the limp-in circuit while the two terminals of the other pole P2 of the switch PBS is connected to an annunciation circuit which alerts a maintainer or operator that the limp-in control is in operation. The other terminal of the one pole P1 is connected by lead L1 to the movable contact MC1 of a cam-operated switch A. The lead L1 is also connected to the movable contact MC2 of a camoperated switch B via lead L2 and is connected via lead L3 to a movable contact MC3 of a minimum reduction pressure operated switch MRPS. The movable contact MC1 of the camoperated switch A normally engages stationary contact S1 which is connected to one end of the coil of the electromagnetic relay RL1 via lead L4, diode D1 and lead L5. The other end of the coil of relay RL1 is connected to the return trainline 4T. The movable contact MC2 of the cam-operated switch B normally engages open stationary contact S2. As shown, the relay RL1 is mechanically linked to a pair of heel contacts RL1A and RL1B. It will be noted that when the relay RL1 is deenergized the heel contacts RL1A and RL1B engage their back contacts BCA and BCB, respectively. The heel contact RL1B is connected to a stationary contact S3 of the minimum reduction pressured operated switch MRPS via lead L6. The back contact BCB of relay RL1 and the front contact FCA of relay RL1 are open contacts. The front contact FCB of relay RL1 is connected to the lead L7. The stationary contact S1' of switch A is contact to heel contact RL1A via lead L8 while the stationary contact S2' of switch B is connected to the movable contact MC4 of an over pressure protection switch OPPS via lead L9. The stationary contact S4 of the over pressure protection switch OPPS is connected to one end of the electrical coil of the supply magnet valve SMV via lead L10. As previously mentioned, the other end of the electrical coil of the supply magnet is connected to the movable heel contact B' of relay OR via lead L11. As shown, the back contact BCA of relay RL1 is connected to one end of the exhaust magnet valve EMV via lead L12 while the other end of the electrical coil of the exhaust magnet valve EMV is connected to the movable heel contact B of relay OR via lead L13.

Again, let us assume that the limp-in circuit is in the position as shown in FIG. 1, and that a maintainer or operator desires to release the brakes on the train or transit car. The limp-in feature is cut-in by depressing the pushbutton switch PB5 which closes the terminals of the two poles P1 and P2. The closing of pole P2 energizes the annunciation circuit while the closing of the pole P2 energizes the relay RL1 via power trainline 13T, pole PI, leads L1, L2, contacts MC1, S1, lead L4, diode D1, lead L5, coil of relay RL1 and return trainline 4T. The energization of the electromagnetic relay RL1 does not have any immediate function on the limp-in operation except that the movable contacts RL1A and RL1B are shifted from the back contacts BCA and BCB to the front contacts FCA and FCB, respectively. In order to release the brakes, the brake handle BH is moved to the release position which causes both of the cams C1 and C2 to pick up, as noted in the truth table in FIG. 2, to shift the movable contact MC1 and MC2 to engage stationary contacts S1' and S2', respectively. This will deenergize the relay RL1 since the cam C1 opens stationary contact S1. Since the pressure in the equalizing reservoir ER is below 103 psi at this time, the movable contact MC3 does not engage stationary contact S3 and the relay RL1 cannot be held energized over its front contact FCB. The picking up of both of the switches A and B causes power to be applied to both the exhaust and supply magnet valves EMV and SMV. The exhaust magnet valve EMV is energized over an electrical circuit extending from power trainline 13T, pole P1, lead L1, contacts MC1, Sl', lead L8, contacts RLLA, BCA, lead L12, the coil of exhaust valve EMV, lead L13, contact B, to return trainline 4T. Similarly, the supply magnet valve SMV is energized over an electrical circuit extending from power trainline 13T, pole P1, leads L1, L2, contacts MC2, S2', lead L9, contacts MC4, S4, lead L10, the coil of supply valve SMV, lead L1, contact B' to return trainline 4T. Thus, when the exhaust and supply magnet valves EMV and SMV are energized, the equalizing reservoir ER will start to charge. That is, the energized exhaust valve EMV is closed off to atmosphere by upper valve portion of valve EMV while the energized supply valve SMV connects the equalizing reservoir ER to the filter main reservoir MR via pipe line PL1, the upper valve portion of valve SMV, and pipe lines PL2 and PL4. When the equalizing reservoir ER reaches 110 psig, which may be observed on a gage in the control cab, the operator should move the brake handle BH to a lap position wherein the switch A remains picked-up while the switch B is released by cam C2 and returns to its normal position as noted in the truth table of FIG. 2. However, if the operator fails to move the brake handle BH to its lap position to deenergize the supply magnet valve SMV, the equalizing reservoir ER will continue to be charged by the main reservoir MR. Now when the pressure reaches 112 psig, the over-pressure protection switch OPPS will open the contacts MC4 and S4 to deenergize the supply magnet valve SMV. This will prevent the equalizing reservoir ER from being overcharged even with the brake BH still in its released position. Leakage to the equalizing reservoir is not maintained in the limp-in mode of operation, except when the pressure drops below a 108 psig and the brake handle is placed in its released position. It will be appreciated that the minimum reduction pressure switch MRPS will be picked-up and close contacts MC3 and S3 but this will not affect anything at this time.

Accordingly, the brakes of the vehicle are released and if the operator or maintainer moves the brake handle to its lap position, it will be seen from the truth tables of FIG. 2, the switch A is picked-up and the switch B remains released but the pressure in the equalizing reservoir ER remains unchanged. Thus, with the brakes released, the maintainer or operator may apply power to bring the disabled vehicle to the repair shop. Upon arrival at the repair shop, the throttle is moved to its off position and so that when the brakes are applied, a minimum reduction of the brake pipe of at least 6 psig is recommended. The minimum reduction pressure switch MRPS is utilized to ensure such a brake pipe reduction operation is carried out. Thus, when the maintainer or operator moves the brake handle BH to the apply position, both of the switches A and B assume their released positions as shown in the truth table of FIG. 2. It will be seen that when the switch A is in its released position, the relay RL1 is energized over a circuit path extending from power trainline 13T, pole P1 of pushbutton switch PBS, lead L1, movable contact MC1, stationary contact S1', lead L4, diode D4, lead L5, the coil of relay RL1 and to return trainline 4T. It will be noted that even if the operator returns the brake handle BH to its lap position, the relay RL1 will remain energized over its closed front contact FCB. The power is removed from the exhaust magnet valve EMV by the opening of the back contact BCA by the movable contact RL1A. Thus, the pressure in the equalizing reservoir ER will continue to drop until it reaches 103 psig at which time the contacts MC3 and S3 of the minimum reduction pressure switch MRPS become opened and deenergizes the relay RL1 to close its contacts RL1A and BCA to thereby energize the exhaust magnet valve EMV. Accordingly, the exhaust valve EMV is cut-off to atmosphere to thereby maintain the equalizing reservoir ER at 103 psig. Thus, the minimum pressure reduction is achieved.

Now, if the operator of the vehicle chooses to keep the brake handle BH in the apply position or moves it from the lap position to the apply position, the pressure in the equalizing reservoir ER will continue to drop. At any time after the minimum reduction is achieved, the pressure in the equalizing reservoir ER can be lower or held at that time. Accordingly, the brake pipe will continue to follow the equalizing reservoir and the vehicle brakes will follow the brake pipe. Any time after the minimum reduction has occurred, the equalizing reservoir can be recharged. The electrical condition or state of the supply and exhaust magnet valve SMV and EMV for the brakes in the apply, release and lap positions is shown in the truth table of FIG. 3.

Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

We claim:

1. A limp-in control arrangement for an electro-pneumatic integrated control system for railway vehicles comprising, an exhaust magnet valve and a supply magnet valve in which the electrical conditions control the brakes on a railway vehicle, an over pressure protection switch connected to said supply magnet valve which is connected to a main pressure reservoir, means for sensing the operational condition of said electro-pneumatic integrated control system, means for enabling a limp-in control function when said electro-pneumatic integrated control system is experiencing a malfunction, means for initiating a limp-in operation by releasing the brakes so that the railway vehicle may be moved to repair said malfunction.

2. The limp-in control arrangement for an electro-pneumatic integrated control system for railway vehicles as defined in claim 1, wherein said exhaust magnet valve is energized when a brake handle is in its released and lap positions and is deenergized when the brake handle is in its application position.

3. The limp-in control arrangement for an electro-pneumatic integrated control system for railway vehicles as defined in claim 1, wherein said supply magnet valve is energized when a brake handle is in its released position and is deenergized when the brake handle is in the application and lap positions.

4. The limp-in control arrangement for an electro-pneumatic integrated control system for railway vehicles as defined in claim 1, wherein said sensing means is an electromagnetic relay which opens and closes selected front and back contacts in accordance with the operational condition of said electro-pneumatic integrated control system.

5. The limp-in control arrangement for an electro-pneumatic integrated control system for railway vehicles as defined in claim 1, when said enabling means includes an electrical switch which is closed to enable said limp-in control function.

6. The limp-in control arrangement for an electro-pneumatic integrated control system for railway vehicles as defined in claim 5, wherein a coil of an electromagnetic relay is energized when said electric switch is closed.

7. The limp-in control arrangement for an electro-pneumatic integrated control system for railway vehicles as defined in claim 6, wherein a minimum reduction pressure switch deenergizes the coil of said electro-magnetic relay when the pressure in an equalizing reservoir drops below a predetermined level.

8. The limp-in control arrangement for an electro-pneumatic integrated control system for railway vehicles as defined in claim 1, wherein said initiating means includes a pair of electrical switches which are controlled by a brake handle.

9. The limp-in control arrangement for an electro-pneumatic integrated control system for railway vehicles as defined in claim 8, wherein said brake handle operates a pair of cam members which open and close said pair of electrical switches.

10. The limp-in control arrangement for an electro-pneumatic integrated control system for railway vehicle as defined in claim 8, wherein both of said pair of electrical switches are released when said brake handle is in an application position.

11. The limp-in control arrangement for an electro-pneumatic integrated control system for railway vehicles as defined in claim 10, wherein said supply magnet valve and said exhaust magnet valve are deenergized when said brake handle is in an application position.

12. The limp-in control arrangement for an electro-pneumatic integrated control system for railway vehicles as defined in claim 8, wherein one of said pair of electrical switches is released and the other of said pair of electrical switches is picked up when said brake handle is in a lap position.

13. The limp-in control arrangement for an electro-pneumatic integrated control system for railway vehicles as defined in claim 12, wherein said supply magnet valve is deenergized and said exhaust magnet valve is energized when said brake handle is in a lap position.

14. The limp-in control arrangement for an electro-pneumatic integrated control system for railway vehicles as defined in claim 8, wherein both of said pair of electrical switches are picked up when said brake handle is in a release position.

15. The limp-in control arrangement for an electro-pneumatic integrated control system for railway vehicles as defined in claim 14, wherein said supply magnet valve and said exhaust magnet valve are energized when said brake handle is in a release position.

16. The limp-in control arrangement for an electro-pneumatic integrated control system for railway vehicles as defined in claim 1, wherein over pressure protection switch deenergizes said supply magnet valve when the pressure in an equalizing reservoir exceeds a predetermined value.

17. The limp-in control arrangement for an electro-pneumatic integrated control system for railway vehicles as defined in claim 1, wherein said supply and exhaust magnet valves each includes a free flow portion and a blocking portion.

18. The limp-in control arrangement for an electro-pneumatic integrated control system for railway vehicles as defined in claim 17, wherein said supply magnet valve exhibits said free flow portion when energized and exhibits said blocking portion when deenergized.

19. The limp-in control arrangement for an electro-pneumatic integrated control system for railway vehicles as defined in claim 18, wherein said exhaust magnet valve exhibits said blocking portion when energized and exhibits said free flow portion when deenergized.

* * * * *